United States Patent [19]

Fulger et al.

[11] 3,952,112

[45] Apr. 20, 1976

[54] METHODS FOR TREATING DRIED FRUITS TO IMPROVE SOFTNESS RETENTION CHARACTERISTICS

[75] Inventors: Charles V. Fulger; Daryl R. Schaller, both of Battle Creek, Mich.

[73] Assignee: Kellogg Company, Battle Creek, Mich.

[22] Filed: July 11, 1973

[21] Appl. No.: 378,123

[52] U.S. Cl................................ 426/321; 426/615
[51] Int. Cl.² ..................... A23B 7/08; A23B 7/14
[58] Field of Search .......... 426/302, 379, 102, 207, 426/465, 321, 286, 431, 289, 281, 455, 486, 615

[56] References Cited
UNITED STATES PATENTS

| 119,442 | 8/1871 | Ackart .............................. 426/270 |
| 1,434,837 | 11/1922 | Newby ............................. 426/379 |
| 1,853,151 | 4/1932 | Segur ............................... 426/302 |
| 1,886,233 | 11/1932 | Scanders .......................... 426/364 |
| 2,005,184 | 6/1935 | Forrest ............................. 426/363 |
| 2,278,469 | 4/1942 | Musher ............................. 426/96 |
| 2,909,435 | 10/1959 | Walters ............................. 426/102 |
| 3,006,773 | 10/1961 | Fitzgerald ......................... 426/340 |
| 3,453,118 | 7/1969 | Jobin ................................ 426/321 |
| 3,843,810 | 10/1974 | Fehmerling ....................... 426/486 |

OTHER PUBLICATIONS
Handbook of Food Additives, 1968, Fowa T. E. Edition, pp. 448–453.

*Primary Examiner*—Raymond N. Jones
*Assistant Examiner*—Ernest G. Therkorn
*Attorney, Agent, or Firm*—Gary, Juettner, Pigott & Cullinan

[57] ABSTRACT

Dried fruits, especially raisins, are treated with an edible water soluble humectant by a variety of methods to establish a humectant level absorbed by the fruit at a value in excess of about 4%, thereby to increase the potential of the fruit to retain, under prolonged storage conditions, sufficient softness to remain tender and flavorful for human consumption. The fruit may be given a preliminary treatment to precondition the surface thereof for humectant penetration and/or to raise the internal moisture content. The fruit is then exposed to a humectant, preferably glycerol, or a solution of glycerol and sorbitol and/or other humectants, until significant levels, at least about 4% by weight, of the humectant are absorbed. The fruit is then washed, if necessary, and dried to a moisture content of about 12 to 20%.

23 Claims, No Drawings

METHODS FOR TREATING DRIED FRUITS TO IMPROVE SOFTNESS RETENTION CHARACTERISTICS

BACKGROUND OF THE INVENTION

This invention relates to a method for preserving or maintaining the softness of dried fruits, such as raisins, sultanas, prunes, dates, currants and muscats, wherein the fruit is stored in isolation or in combination with other food products, including relatively dry ready-to-eat cereal breakfast foods.

Fresh raisins and other dried fruits, even when sealed in waxed paper and foil within paperboard containers, progressively lose their softness and became hard, presumably because of moisture losses and chemical changes. The loss of softness or tenderness becomes more pronounced when the raisins are similarly packed with dry food products, such as toasted bran or corn flakes, which have a low moisture content relative to the raisins. In order to prevent rapid loss of moisture from the raisins to the cereal, it previously has been necessary to increase the moisture content of the cereal prior to packaging with raisins. The addition of moisture to the cereal, however, causes a substantial loss of crispness, which is undesirable in many such products.

The simple topical application of a humectant to a dried fruit having a relatively tough outer skin does not reliably increase the softness retention characteristics of the fruit under storage conditions, and the fruit will absorb only small amounts of the humectant through the skin. Moreover, any improvement in softness retention resulting from the initial incorporation of a high level of moisture into the fruit is quickly lost during conventional storage. Although it is possible to grind the fruit into a paste prior to treatment with humectant, the original texture and characteristics of the fruit are thereby permanently destroyed.

There are various known methods which involve the treatment of whole fruit, such as raisins, to improve storage and other qualities. For example, the Jobin U.S. Pat. No. 3,453,118 describes a process wherein raisins are soaked in a hot, weak acidic bath to improve softness retention characteristics. Additional patents which disclose the treatment of fruits with humectants or other materials are U.S. Pat. Nos. 119,441, 1,934,837, 2,278,469 and 3,006,773.

In the copending application of Charles V. Fulger and Thomas D. Morfee, Ser. No. 171,011, filed Aug. 11, 1971, now abandoned, a process is disclosed which effectively prolongs the softness retention characteristics of dried fruit by causing the fruit to absorb at least 4%, and preferably up to 6% to 10% or more, of an added humectant. According to this process, whole dried fruits, such as raisins, are dipped into a weak acid bath heated to about 120°F., rinsed with water and allowed to stand briefly, dipped into glycerol and then allowed to stand for about 24 hours until the glycerol has been absorbed, and then dried to a moisture content of from about 12% to 20%. The raisins thus treated are soft, tender and flavorful and retain these characteristics for prolonged periods of storage in comparison with untreated raisins.

SUMMARY OF THE INVENTION

The present invention provides improvements upon the Fulger and Morfee process and also provides additional and alternative methods of treating essentially whole dried fruits whereby appreciable absorption of the humectant, in excess of about 4%, is assured. Suitable humectants include primarily edible polyalcohols, such as glycerol, sorbitol, maltitol and others, as well as mixtures thereof.

In order to achieve appreciable humectant infusion in dried fruit, we have found that it is necessary to reduce the resistance of the skin and the internal structure of the fruit to humectant absorption. According to the present invention, this may be accomplished by application of a vacuum, by treatment with a cleansing agent or alkali, and/or by soaking the fruit in water under such conditions as to substantially increase the moisture content thereof. All of these treatments have been found to remove air bubbles entrapped in the crevices of the fruit or otherwise to increase the receptivity of the fruit to subsequent uptake of humectant. The pre-treated fruit is then exposed to the humectant in liquid form, such as by soaking, dipping or spraying, and the treated fruit may also be allowed to stand and temper to assure full infusion of the humectant. The fruit is then washed and dried to reduce the moisture content to about 12% to about 20%.

As an alternative, it has been found that essentially whole dried fruit will absorb an appreciable amount of humectant when the fruit is soaked in a diluted aqueous solution of humectant, in the absence of other additives, if the temperature of the humectant bath is raised or if the fruit is soaked in the aqueous solution for a prolonged period of time. This latter procedure lends itself well to treating the raisins in bulk as they are being shipped for long distances.

DESCRIPTION OF THE PREFERRED EMBODIMENTS

The dried fruit is preferably provided in essentially whole form with the skin essentially intact on the surface. The fruits to which the invention is applicable comprise whole raisins, sultanas, prunes, dates, currants and muscats.

After the fruit has been suitably cleaned by washing with water, the fruit is treated to increase its receptivity to infusion by a humectant. It is believed that the humectant enters the fruit by one or more mechanisms akin to capillary action, osmosis or dialysis, and hence the fruit is treated to increase the permeability of the skin, to decrease the osmotic pressure within the fruit, or otherwise to eliminate impediments to infusion by the humectant.

In one embodiment of the present invention, the raisins are treated to remove surface air bubbles while submerged in a liquid. If, for example, fresh raisins are placed in a water bath, there are observable small bubbles of air which adhere to the skin surface, especially in the crevices. It has been found that the presence of the bubbles prevents full contact between the fruit and the humectant, and hence such bubbles are preferably removed either prior to or during exposure to the humectant. Moreover, it has been found that fruit waxes present on the skin surface inhibit infusion of the humectant through the skin. For these purposes, the fruit may be briefly washed in a water bath containing a surfactant or an alkali, which tends to dissolve fruit waxes and remove bubbles. The term "surfactant" as used herein is intended to include both soap and synthetic detergents. In the alternative or in combination with washing, the pressure over a water bath containing the fruit may be reduced by drawing a vacuum on the bath, which causes the air bubbles to float to the surface.

After one or more of the above preliminary treatments have been completed, the raisins are exposed to a humectant for a sufficient period of time to permit in excess of about 4% of the humectant to be absorbed. For dried fruit which is to be packaged alone, the humectant level is preferably at least 6%; and for fruit which is to be packaged with a dry food or cereal, the humectant level is preferably at least about 9%. The humectant employed is preferably glycerol, or a mixture of glycerol and sorbitol, although other edible polyalcohols may be beneficially employed, such as sorbitol and maltitol, alone, in solution with one another, or in solution with glycerol. Other suitable humectants, which may be employed alone or in combination with one or more of the above, include glucose, invert syrups, propylene glycol, and mixtures thereof.

The humectant, which is provided in liquid or solution form, may be applied to the fruit by soaking or dipping the fruit in the humectant, or by spraying the humectant onto the surface of the fruit. The fruit may then be allowed to stand or temper until the humectant is substantially completely absorbed or until the desired humectant content has been obtained, The term "humectant content" as used herein means the amount of humectant that is actually absorbed into the interior of the fruit and excludes humectant which is present on the surface of the fruit which may be removed by simple washing.

It is important that the preliminary soap or alkali treatment and the humectant treatment be carried out sequentially as above described. Beneficial results are not obtained when soap or an alkali or a mild acid is added to the humectant for simultaneous contact with the fruit. On the other hand, the vacuum treatment lends itself to simultaneous one step processing, i.e., by drawing a vacuum on a bath containing fruit immersed in humectant or an aqueous solution of humectant.

If glycerol is used as a humectant, it has been found that dilution of the glycerol with water up to a certain limit substantially increases the rate at which the glycerol will be absorbed. Preferably the glycerol is diluted by at least 8% with water, although higher dilutions, up to 50% water and greater, may be employed. The higher dilutions are not generally advantageous since the water is absorbed along with the glycerol, and then must be removed by drying, inasmuch as the moisture content of the treated fruit should be between about 12% to about 20% to achieve a satisfactory product.

It has also been discovered that raisins and other dried fruit having an external skin, while normally impervious to the absorption of humectant by simple topical application, will absorb a significant amount of the humectant if the fruit is allowed to soak in the humectant for a long period of time. Furthermore, the rate of absorption is substantially affected by the temperature of the humectant and fruit at the time of the exposure. At least one day of soaking in a glycerol solution at room temperature is required to achieve a glycerol content in excess of 4%. As the temperature is increased, however, the rate of absorption is increased exponentially, and much shorter times are required to obtain the desired humectant level.

For example, raisins originally containing 11% moisture when placed in a glycerol solution at 220°F. and permitted to cool down gradually to room temperature absorb about 14.2% glycerol in one day. The temperature of the humectant in liquid form is preferably above room temperature but below the boiling point thereof.

If sufficient exposure time to the humectant is allowed, the preliminary treatments, such as washing with soap or alkali, may be omitted, and the fruit may be soaked in the humectant for a period of one or more days, either at room or elevated temperature, until the desired humectant level is reached. At room temperatures, a soaking period normally exceeding two or three days will be required to achieve a 6–10% absorption of humectant. However, as previously explained, the rate of humectant absorption can be increased by using a water diluted solution of the humectant.

The embodiment of extended soaking times in glycerol solutions may be carried out as the raisins or other fruit are being shipped in bulk from its source or origination to the food processor or packer. For example, the raisins may be shipped by rail or truck while immersed in a glycerol solution contained in a tank car or other suitable container. The food processor will need only to drain or centrifuge the excess glycerol from the raisins upon arrival, provided that the necessary soaking period has elapsed.

It has also been found that the initial moisture content of the fruit, prior to exposure to the humectant, affects the rate at which the humectant will be absorbed. In general, the higher the initial moisture content of the raisins, the faster will be the rate of absorption. It is believed that at the higher moisture levels, the moisture dissolves fruit sugars in the fruit and enables the humectant to penetrate the fruit more easily.

Standard field raisins will normally contain an average of 11% moisture by weight. If the raisins are cleaned by normal washing procedures for the retail market, they will eventually contain about 15% to 16% moisture. If 11% moisture raisins are soaked for 4 days at room temperature in 100% glycerol, they will absorb only about 3.7% glycerol. If the initial moisture is increased to 16%, then 5.6% glycerol will be absorbed. Under the same conditions in a 90% glycerol solution, raisins initially containing 11% moisture will absorb 12.0% glycerol and at an initial moisture of 22%, will absorb 26.6% glycerol.

In view of the foregoing, it is preferable to raise the moisture content of raisins to a level above the normal 11% before treatment with the humectant, and preferably the level is increased above 16% if the fruit is to be simply soaked in a substantially concentrated humectant, in order to achieve the desired humectant levels. The expedient of raising the initial moisture level of the raisins may be used as the sole step prior to humectant treatment or can be combined with any of the other steps described herein for increasing the rate of humectant absorption.

After the desired humectant level has been obtained, the treated fruit may be dried, if necessary, by the gentle passage of warm air thereover. Generally, a final moisture between about 12% to about 20% will be preferred, and optimum results are realized within the range of about 13% to about 16% moisture. If possible, the treatment of the fruit is carried out such that a minimum of subsequent drying will be required, and such may be conveniently accomplished by adjusting the humectant to water ratio in the treatment bath or by adjusting the moisture level in the fruit before exposure to the humectant.

The treated dried fruit closely resembles untreated fresh dried fruit in terms of appearance, taste and texture, but the treated fruit exhibits very substantial superiority over the untreated in its ability to remain soft and palatable over extended storage periods. The fruit may be packaged and sold as such or may be incorporated into other foods without adverse effects on softness retention. For example, the treated fruit may be packaged with relatively dry ready-to-eat cereals without substantial loss of softness during prolonged storage.

The following examples are given in further illustration of the present invention.

EXAMPLE 1

Rough graded raisins containing 11% by weight moisture were divided into eight separate groups and were given various treatments prior to or in combination with soaking in a solution containing 90% glycerol and 10% water at 72°F. for a total period of 4 days. The glycerol content of each batch was determined at the end of each day.

The Group 1 raisins were simply rinsed with water and placed in the glycerol bath. The Group 2 raisins were first washed in a weak acid, rinsed, and then added to the glycerol bath. The Group 3 raisins were washed with a 5% detergent solution before being added to the glycerol bath. Group 4 raisins were soaked in water until a moisture content in excess of 22% had been achieved and were then added to the glycerol bath. The Group 5 and 6 raisins were given no preliminary treatment; however, 5% detergent by weight was added to the Group 5 glycerol and 3% phosphoric acid was added to the Group 6 bath. The Group 7 raisins were added directly to the glycerol bath heated to 220°F. and then allowed to cool to room temperature. The Group 8 raisins were washed in water and given vacuum treatment before adding to the glycerol solution. The results are summarized below.

| GROUP | TREATMENT | % GLYCEROL IN RAISINS | | | |
|---|---|---|---|---|---|
| | | 1 da. | 2 da. | 3 da. | 4 da. |
| 1 | Water rinse only | 4.2 | 6.9 | 9.2 | 12.1 |
| 2 | Acid wash | 10.0 | 13.9 | 16.5 | 19.8 |
| 3 | Detergent wash | 8.5 | 13.7 | 15.4 | 18.5 |
| 4 | Soaked in water | 14.5 | 20.0 | 23.2 | 26.6 |
| 5 | 5% detergent added | 3.3 | 5.5 | 7.3 | 8.8 |
| 6 | 3% acid added | 4.4 | 6.4 | 7.4 | 10.7 |
| 7 | Hot bath | 14.2 | 14.7 | 16.1 | 16.9 |
| 8 | Water washed then vacuum (Interpolated data) | 5.5 | 7.8 | 9.3 | 12.3 |

It may be seen that the raisins of Groups 2, 3, 4, 7 and 8, which were treated in accordance with the principles of the present invention (or in accordance with the Fulger and Morfee process (Group 2)), absorbed substantially higher levels of glycerol at faster rates than the untreated raisins, and it may be seen that the addition of soap or acid to the glycerol bath itself yields greatly reduced results when compared to the sequential treatment described herein.

EXAMPLE 2

Rough graded raisins containing 11% moisture were soaked for four days in concentrated or water diluted glycerol at room temperature and at temperatures above and below room temperature. The results, in terms of percentages by weight of glycerol absorption, are set forth in the following table.

| Temperature | % Glycerol in Bath | | |
|---|---|---|---|
| | 100% | 92% | 84% |
| | %Glycerol in Raisins | | |
| 40°F | 3.0% | 4.0% | 7.5% |
| 72°F | 3.7% | 10.0% | 15.6% |
| 88°F | 6.0% | 16.0% | 20.0% |

From the above, it may be seen that increases in temperature and dilution of the glycerol each significantly increase the rate of infusion of glycerol into the raisins.

EXAMPLE 3

Raisins containing 16% moisture were immersed in a 50% by weight aqueous solution of glycerol at 120°F., the chamber containing the mixture was evacuated for 20 minutes, and then held at 120°F. for 2 hours and 10 minutes at atmospheric pressure. After washing, the raisins were found to contain 8.8% glycerol and 30.2% moisture. Upon drying the raisins to a moisture content of 15.5%, the glycerol content would be 10.3%.

EXAMPLE 4

Rough-graded raisins were placed in a 90% aqueous solution of glycerol and held at room temperature (72°F.) for 5 days. The resulting glycerol content was found to be 9.9% and the moisture content 16%.

From the foregoing, it may be seen that the present invention provides significant improvements over and alternatives to the aforesaid Fulger and Morfee process and provides for treatment of raisins and other dried fruits in such manner as to impart significant storage stability, both in terms of humectant uptake and retention of softness. The treated fruit may be used either alone or may be incorporated into composite food products, such as with a relatively dry breakfast food.

In summary, it may be seen that several variables affect the rate of humectant absorption into dried fruit and may be controlled to attain optimum rates of absorption. First, the composition of the glycerol solution may be varied, with higher dilutions usually being productive of an increased rate of absorption. Second, the higher the initial moisture content of the fruit, the faster will be the rate of humectant absorption. Third, the surface conditions of the fruit affect the rate of absorption and beneficial results are attained by removing surface air bubbles and dissolving external fruit waxes prior to exposure to the humectant. Fourth, the temperature of the humectant has a highly significant effect on humectant absorption, with higher temperatures producing higher absorption rates.

We claim:

1. Method for improving softness retention characteristics of dried fruits comprising the steps of first immersing the fruit in an edible liquid for a period of time sufficient to remove surface air bubbles therefrom, and then treating the fruit with a water soluble edible humectant until the humectant content of the fruit is in excess of 4%.

2. The method of claim 1 wherein the step of removing air bubbles from the fruit comprises washing the fruit in an aqueous solution containing one of the agents selected from the group consisting of an alkali and a surfactant.

3. The method of claim 1 wherein the humectant is selected from the group consisting of glycerol, sorbitol, maltitol, glucose, invert syrups, propylene glycol and mixtures thereof.

4. The method of claim 1 wherein the fruit is whole raisins and the humectant is glycerol.

5. The method of claim 4 wherein the humectant is a mixture of glycerol and water, and the raisins are soaked therein until the glycerol content thereof exceeds 4% by weight.

6. The method of claim 1 wherein the internal moisture content of the fruit is increased to a value in excess of 16% by applying water to the fruit prior to treatment thereof with a humectant.

7. The method of claim 1 wherein said humectant is provided in liquid form, and is heated to a temperature above 70°F and below the boiling point thereof.

8. The method of claim 7 wherein said humectant is glycerol containing from zero to about 50% water.

9. The method of claim 1 wherein the dried fruit is selected from the group consisting of raisins, sultanas, prunes, dates, currants and muscats.

10. The method of claim 1 including the further step of removing the fruit from the liquid humectant and then drying the fruit to a moisture level of from about 12% to about 20%.

11. The method of claim 1 wherein the pressure over said edible liquid is reduced while the fruit is immersed therein, whereby surface air bubbles are removed from said fruit.

12. Method of treating dried fruits to improve softness retention characteristics comprising the steps of first increasing the internal moisture content of the fruit by applying water thereto until said moisture level exceeds 16%, and then treating said fruit with an edible humectant in liquid form for a period of time until in excess of 4% of humectant has been absorbed into said fruit, said humectant being selected from the group consisting of glycerol and aqueous solutions of glycerol, sorbitol, maltitol, glucose, invert syrups, propylene glycol and mixtures thereof.

13. The method of claim 12 wherein said fruit is raisins.

14. The method of claim 12 wherein the step of treating said fruit with a humectant comprises soaking said fruit therein.

15. The method of claim 12 wherein said liquid humectant is heated to a temperature in excess of about 70°F and below the boiling point thereof and said fruit is soaked therein.

16. Method of treating dried fruits to improve softness retention characteristics comprising the steps of immersing fresh dried fruit having the skin essentially intact into a liquid humectant selected from the group consisting of glycerol, aqueous solutions of glycerol, sorbitol, maltitol, glucose, invert syrups, propylene glycol, and mixtures thereof, soaking the fruit in the liquid humectant until the internal humectant content of said fruit absorbed through the skin exceeds 4% by weight, removing the dried fruit from the liquid humectant, and drying the fruit to a moisture level of from about 12% to about 20%.

17. The method of claim 16 wherein the humectant is retained at prevailing room temperature and the fruit is soaked therein for a period in excess of 1 day.

18. The method of claim 16 wherein the fruit is soaked in said humectant for a period of time in excess of 4 days.

19. The method of claim 16 wherein said liquid humectant is heated to a temperature above about 70°F. and below the boiling point thereof.

20. The method of claim 16 wherein said dried fruit is raisins and said humectant is glycerol containing zero to about 50% water.

21. The method of claim 16 wherein said raisins are soaked in said humectant until the internal humectant content of said raisins is at least about 6% by weight.

22. The method of claim 21 wherein the humectant content is at least about 9% by weight.

23. Method for improving softness retention characteristics of dried fruits comprising the steps of first washing the fruit in an aqueous solution containing one of the agents selected from the group consisting of an alkali and a surfactant, and then treating the fruit with a water soluble edible humectant in liquid form until the internal humectant content of the fruit is in excess of 4 per cent.

* * * * *

REEXAMINATION CERTIFICATE (396th)
United States Patent [19]
Fulger et al.

[11] B1 3,952,112
[45] Certificate Issued  Oct. 8, 1985

[54] METHOD FOR TREATING DRIED FRUITS TO IMPROVE SOFTNESS RETENTION CHARACTERISTICS

[75] Inventors: Charles V. Fulger; Daryl R. Schaller, both of Battle Creek, Mich.

[73] Assignee: Kellogg Company, Battle Creek, Mich.

Reexamination Request:
No. 90/000,577, Jun. 15, 1984

Reexamination Certificate for:
Patent No.: 3,952,112
Issued: Apr. 20, 1976
Appl. No.: 378,123
Filed: Jul. 11, 1973

[51] Int. Cl.⁴ .......................... A23B 7/08; A23B 7/14
[52] U.S. Cl. ................................... 426/321; 426/615
[58] Field of Search ............... 426/102, 281, 286, 289, 426/302, 321, 431, 455, 486, 615

[56] References Cited

U.S. PATENT DOCUMENTS

3,453,118  7/1969  Jobin ................................ 426/321
3,843,810  10/1974  Fehmerling ....................... 426/486

FOREIGN PATENT DOCUMENTS

910971  11/1962  United Kingdom.
1027002  4/1966  United Kingdom.
1239316  7/1971  United Kingdom.
1251357  10/1971  United Kingdom.

OTHER PUBLICATIONS

"Raisin Utilization Experiments–1952" by W. V. Cruess and D. Musco, in "20 Years of Raisin Research 1949–1969" compiled by California Raisin. Advisory Board (1967) p. 343 et seq, at 351.

"American Miller & Processor", Dec. 1953, article entitled "Fruited Breakfast Cereals" by D. Musco & W. V. Cruess, Publications, Inc. (1953), p. 14 et seq, at 21. Reprinted in "20 Years of Raisin Research 1949–1969" compiled by California Raisin Advisory Board (1967), p. 430 et seq. at 433.

"Raisin Utilization Experiments 1953–1954" by W. V. Cruess and R. Binder, published in "20 Years of Raisin Research 1949–1969", compiled by California Raisin Advisory Board (1967), p. 318 et seq. at 321–22.

*Primary Examiner*—Ernest G. Therkorn
*Attorney, Agent, or Firm*—Russell W. Pyle; Thomas R. Juettner; Thomas G. Howell

[57] ABSTRACT

Dried fruits, especially raisins, are treated with an edible water soluble humectant by a variety of methods to establish a humectant level absorbed by the fruit at a value in excess of about 4%, thereby to increase the potential of the fruit to retain, under prolonged storage conditions, sufficient softness to remain tender and flavorful for human consumption. The fruit may be given a preliminary treatment to precondition the surface thereof for humectant penetration and/or to raise the internal moisture content. The fruit is then exposed to a humectant, preferably glycerol, or a solution of glycerol and sorbitol and/or other humectants, until significant levels, at least about 4% by weight, of the humectant are absorbed. The fruit is then washed, if necessary, and dried to a moisture content of about 12 to 20%.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 8 and 10 are cancelled.

Claims 1, 12, 16, 20 and 23 are determined to be patentable as amended.

Claims 2-7, 9, 11, 13-15, 17-19, 21 & 22, dependent on an amended claim, are determined to be patentable.

New claims 24-27 are added and determined to be patentable.

1. Method for improving softness retention characteristics of dried fruits *by treatment with a humectant, said method* comprising the steps of first immersing the fruit in an edible liquid *and pretreating the fruit in a manner and* for a period of time *in said liquid* to remove surface air bubbles therefrom, [and] then treating the fruit with a water soluble edible humectant *having a concentration greater than 50%* until the humectant content [of] *absorbed by* the fruits is in excess of 4%, *removing the fruit from the humectant and drying the fruit to a moisture level of from about 12% to about 20%.*

12. [Method] *An improved method* of treating dried fruits *with a humectant* to improve softness retention characteristics *of the fruits, said method* comprising the steps of first increasing the internal moisture content of the fruit by applying water thereto until [said] *the* moisture level exceeds 16%, *whereby the fruit is rendered more receptive to subsequent humectant absorption,* [and] then treating said fruit with an edible humectant in liquid form *and having a concentration in excess of 50%* for a period of time until in excess of 4% [of] humectant has been absorbed into said fruit, said humectant being selected from the group consisting of glycerol and aqueous solutions of glycerol, sorbitol, maltitol, glucose, invert syrups, propylene glycerol and mixtures thereof, *and drying said fruit to a moisture of from about 12% to about 20%.*

16. [Method] *An improved method* of treating dried fruits *with a humectant* to improve softness retention characteristics comprising the steps of immersing fresh dried fruit having the skin essentially intact into a liquid humectant selected from the group consisting of glycerol, aqueous solutions of *in excess of 50% concentration of* glycerol, sorbitol, maltitol, glucose, invert syrups, propylene glycol, and mixtures thereof, soaking the fruit in the liquid humectant [until] *for a period of time sufficient to cause* the internal humectant content of said fruit absorbed through the skin [exceeds] *to exceed* 4% by weight, removing the dried fruit from the liquid humectant, and drying the fruit to a moisture level of from about 12% to about 20%.

20. The method of claim 16 wherein said dried fruit is raisins and said humectant is glycerol [containing zero to about 50% water].

23. Method for improving softness retention of dried fruits *by treatment with a humectant* comprising the steps of first *increasing the receptiveness of the fruit to humectant absorption by* washing the fruit in an aqueous solution containing one of the agents selected from the group consisting of an alkali and a surfactant, [and] then [treating] *infusing* the fruit with a water soluble edible humectant in liquid form *having a concentration of over 50%* until internal humectant content of the fruit is in excess of 4%, *and drying the fruit to a moisture content of about 12% to about 20%.*

24. *An improved method of increasing softness retention characteristics of dried fruits having intact surface skins wherein the fruit is treated with a humectant, said method comprising the steps of first pretreating the fruit in a liquid medium and for a time sufficient to render the fruit more receptive to absorption of humectant, then infusing the fruit with a water soluble edible humectant having a concentration of over 50% until the absorbed humectant content in the fruit exceeds 4%, and then drying the fruit as required to a moisture content of from about 12% to about 20%.*

25. *The method of claim 1 wherein the fruit is treated with said humectant until the humectant content absorbed by the fruit is in excess of 6%.*

26. *The method of claim 1 wherein the fruit is treated with said humectant until the humectant content absorbed by the fruit is in excess of 9%.*

27. *The method of claim 24 wherein the humectant content absorbed by the fruit is in excess of 9%.*

* * * * *